US009650300B2

(12) United States Patent
Amstutz

(10) Patent No.: US 9,650,300 B2
(45) Date of Patent: May 16, 2017

(54) DISSOLVABLE CEMENTITIOUS COMPOSITE INGREDIENT PACKET

(71) Applicant: Caterpillar Inc., Peoria, IL (US)

(72) Inventor: Aaron K. Amstutz, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/233,158

(22) Filed: Aug. 10, 2016

(65) Prior Publication Data

US 2016/0347663 A1 Dec. 1, 2016

Related U.S. Application Data

(63) Continuation-in-part of application No. 14/610,508, filed on Jan. 30, 2015.

(51) Int. Cl.
| | |
|---|---|
| *C04B 28/06* | (2006.01) |
| *C04B 16/04* | (2006.01) |
| *C04B 24/40* | (2006.01) |
| *C04B 24/26* | (2006.01) |
| *C04B 40/06* | (2006.01) |
| *B65B 3/02* | (2006.01) |
| *B65D 65/46* | (2006.01) |
| *C04B 103/00* | (2006.01) |

(Continued)

(52) U.S. Cl.
CPC .............. *C04B 28/06* (2013.01); *B65B 3/02* (2013.01); *B65D 65/46* (2013.01); *C04B 16/04* (2013.01); *C04B 24/2641* (2013.01); *C04B 24/40* (2013.01); *C04B 40/0641* (2013.01); *C04B 2103/0046* (2013.01); *C04B 2103/0053* (2013.01); *C04B 2103/0062* (2013.01); *C04B 2103/20* (2013.01); *C04B 2111/00301* (2013.01)

(58) Field of Classification Search
CPC .... C04B 2103/0046; C04B 2103/0062; C04B 2111/00301; C04B 28/06; C04B 16/04; C04B 24/40; C04B 24/2641; C04B 40/0641; B65B 3/02; B65D 65/46
See application file for complete search history.

(56) References Cited

U.S. PATENT DOCUMENTS

| | | | |
|---|---|---|---|
| 4,096,944 A | * 6/1978 | Simpson | ............. C04B 40/0666 106/784 |
| 4,410,366 A | 10/1983 | Birchall et al. | |

(Continued)

FOREIGN PATENT DOCUMENTS

| | | |
|---|---|---|
| DE | 3643464 | 6/1988 |
| EP | 0280971 | 9/1988 |

(Continued)

OTHER PUBLICATIONS

Machine translation of JP 2010-159378. Jul. 2010.*

(Continued)

*Primary Examiner* — John Uselding
(74) *Attorney, Agent, or Firm* — Finnegan, Henderson, Farabow, Garrett & Dunner, LLP

(57) ABSTRACT

A packaged composition may include a package made from a water-soluble polymer material. The package may be configured to contain a cementitious composition. The cementitious composition may include water in the form of microencapsulated water spheres and high alumina cement.

8 Claims, 3 Drawing Sheets

(51) Int. Cl.
*C04B 103/20* (2006.01)
*C04B 111/00* (2006.01)

(56) References Cited

U.S. PATENT DOCUMENTS

| | | | |
|---|---|---|---|
| 4,772,326 A * | 9/1988 | Heinen et al. | C04B 22/12 |
| | | | 106/614 |
| 4,961,790 A | 10/1990 | Smith et al. | |
| 5,106,890 A | 4/1992 | Maruhashi et al. | |
| 6,306,210 B1 | 10/2001 | Miksic et al. | |
| 6,348,093 B1 | 2/2002 | Rieder et al. | |
| 6,797,052 B1 | 9/2004 | Chowdhury | |
| 8,277,556 B2 | 10/2012 | Berke et al. | |
| 2005/0172862 A1 | 8/2005 | Rich | |
| 2012/0067250 A1 | 3/2012 | Bracegirdle | |
| 2014/0293728 A1 | 10/2014 | Duveau et al. | |
| 2015/0231863 A1* | 8/2015 | Knebel et al. | B32B 27/08 |
| | | | 442/327 |

FOREIGN PATENT DOCUMENTS

| | | |
|---|---|---|
| EP | 0 585 998 B1 | 8/1993 |
| EP | 0 590 948 B1 | 9/1993 |
| JP | 11314643 | 11/1999 |
| JP | 2010159378 | 7/2010 |

OTHER PUBLICATIONS

T. Sugama Citirc Acid as a Set Retarder for Calcium Aluminate Phosphate Cements. Halliburton. Jan. 2005.*
Amstutz A., "Macro Defect Free Cement with Improved Moisture Resistance", U.S. Appl. No. 14/610,469, filed Jan. 30, 2015.
Bonapasta, A. A. et al., "Cross-Linking of Poly(Vinyl Alcohol) Chains by Ca Iions in Macro-Defect-Free Cements," *American Cancer Society*, 14, pp. 1016-1022, 2002.
Bortzmeyer, D. et al., "Microstructure and mechanical properties of macro-defect-free cements," *Journal of Materials Science*, 30, pp. 4138-4144, 1995.
Donatello, S. et al., "Recent developments in macro-defect-free (MDF) cements," *Construction and Building Materials*, 23, pp. 1761-1767, 2009.
Drábik, M. et al., "Macro Defect Free Materials; Mechanochemical Activation of Raw Mixes as the Intensifying Tool of the Entire MDF Synthesis," *Ceramics—Silikáty*, 57 (2), pp. 120-125, 2013.
Drábik, M. et al., "Macro Defect Free Materials; The Challenge of Mechanochemical Activation," *Ceramics—Silikáty*, 56 42), pp. 396-401, 2012.
Lepingle, M., et al., "Esterfication with H.A.C."
Lepingle, M., et al., "Use of the hydraulic binders as condensation agents in organic reactions by the elimination of water," 2 pgs., 1956.
Milliken, "GeoFuse™Advanced Geopolymer Coating," Technical Data Sheet, Nov. 2013.
Popoola O O et al.: "Microstructural and Microchemical Characterization of a Calcium Aluminate-Polymer Composite (MDF Cement)", Journal of the American Ceramic Society, Blackwell Publishing, Malden, MA, US. vol. 74, No. 8, Aug. 8, 1991, pp. 1928-1933, XP000230590, ISSN: 003-7820, DOI: 10.111/J.1151-2916.1991.TB07811.
Rai, S.K. et al., "Synthesis and Characterization of Polyvinyl alcohol hydrogel," Proceedings of 2010 International Conference on Systems in Medicine and Biology, IIT Kharagpur, India, pp. 360-364, Dec. 16-18, 2010.
Young, J.F., Cement Paste Matrix Composite Materials Center—Final Report—Jan. 1990.
P. P. Russell, J. Shunkwiler, M. Berg, and J. F. Young, Moisture Resistance of Macro-Defect-Free Cement, Ceram. Trans. 16 (1990): 501-519, Center for Cement Composite Materials, University of Illinois, Urbana, IL 61801.

* cited by examiner

_US 9,650,300 B2_

DISSOLVABLE CEMENTITIOUS COMPOSITE INGREDIENT PACKET

RELATED APPLICATIONS

This application is a continuation-in-part application of U.S. application Ser. No. 14/610,508, filed Jan. 30, 2015, the contents of which are expressly incorporated herein by reference.

TECHNICAL FIELD

The present disclosure relates generally to cementitious composites, and more particularly, to cementitious composite ingredient packets.

BACKGROUND

Roadways, sidewalks, bridges, buildings, water ducts, reservoirs, and other infrastructure and structural components are often manufactured from cementitious composites such as concrete. Concrete includes cement and other things, such as various aggregates and paste. Aggregates include small materials such as sand, gravel or crushed stone. Often, the paste that holds the aggregates together is water and Portland cement. Portland cement is a generic term for the most prevalent type of cement. Cement typically makes up from 10% to 15% of the total mass of concrete. Portland cement is a type of hydraulic cement, which means that when water is added, a chemical reaction is started that causes the cement to harden and set, holding the aggregates together in a rocklike mixture—concrete. Before the concrete is allowed to harden, the concrete mix is poured into a mold so that it will harden into the desired shape. The Portland cement is typically made from a combination of calcareous material (usually limestone or other calcium carbonate-based materials) and argillaceous material (usually siliceous and aluminous minerals containing substantial amounts of clay-like components).

High strength cement-based materials such as macro-defect-free (MDF) cements are being developed for use in many applications that have not been possible with traditional cement and concrete technology. MDF refers to the absence of relatively large voids or defects which are usually present in conventional mixed cement pastes because of entrapped air, inadequate dispersion, and porosity that develops as water soaks into cement particles and aggregate and leaves behind voids. Such voids and defects limit the strength of conventional Portland cement. MDF cement is a polymer-cement composite. The polymer and cement react synergistically to create a unique microstructure with distinct characteristics. The base polymer of the cementitious composite of MDF cement is a water-dissolvable polymer, such as polyvinyl alcohol (PVOH). High shear mixing that is akin to rubber mixing is applied to the mixture during production. MDF cements are characterized by very high flexural strength and a high modulus of elasticity. Flexural strength, also known as modulus of rupture, bend strength, or fracture strength, is a mechanical parameter that is defined as a material's ability to resist deformation under load. Modulus of elasticity is a number that measures an object or substance's resistance to being deformed elastically when a force is applied to it. These desirable characteristics are thought to be a result of the elimination of the majority of the voids that are in typical cementitious composites caused by air entrapped during the mixing, and the elimination of the majority of pores and capillaries that are formed when water is desiccated during cement hydration. Similar to traditional concrete recipes, a wide range of ingredients may be added to the MDF cement to act as plasticizers, accelerators, retardants, and water-reducing agents. Called admixtures, these additives can be used to increase the workability of a cement mixture, the strength of the cement after application, the amount of time the cement will take to harden and achieve full strength, and other desirable properties. The proportions of the various raw materials that go into the cement must be carefully controlled and measured in order to obtain a finished product with the desired characteristics.

Japanese published application no. JP11314643 of Hokushin, published on Nov. 16, 1999, discloses a cementitious composite packet in which the materials needed to produce the finished cement are placed in powdery-granular form into a bag made of water-soluble plastic film. The quantities of the powdery-granular materials are provided in the bags. A problem not addressed by the Japanese published application no. JP11314643 is the potential difficulty in providing the precise amount of water that is needed when mixing one or more bags of the cementitious composite in order to achieve desired mechanical characteristics and setting times for the cement.

The disclosed compositions are directed to overcoming one or more of the problems set forth above and other problems of the prior art.

SUMMARY

In one aspect, the present disclosure is directed to a packaged composition. The packaged composition may include a package made from a water-soluble polymer material. The package contains a cementitious composition. The cementitious composition may include water in the form of microencapsulated water spheres, and high alumina cement.

In another aspect, the present disclosure is directed to a macro-defect-free (MDF) cementitious composition. The MDF cementitious composition may include 90-110 parts by weight polyvinyl alcohol, 180-220 parts by weight water in the form of microencapsulated water spheres, and 1800-2200 parts by weight high alumina cement (HAC).

In yet another aspect, the disclosure is directed to a method of preparing a package of a MDF cementitious composition. The method may include fabricating a bag from polyvinyl alcohol comprising ≥85% saponified polyvinyl alcohol acetate, adding dry ingredients to the bag including high alumina cement (HAC), and adding water to the bag in the form of microencapsulated water spheres.

DETAILED DESCRIPTION

Figure 1:
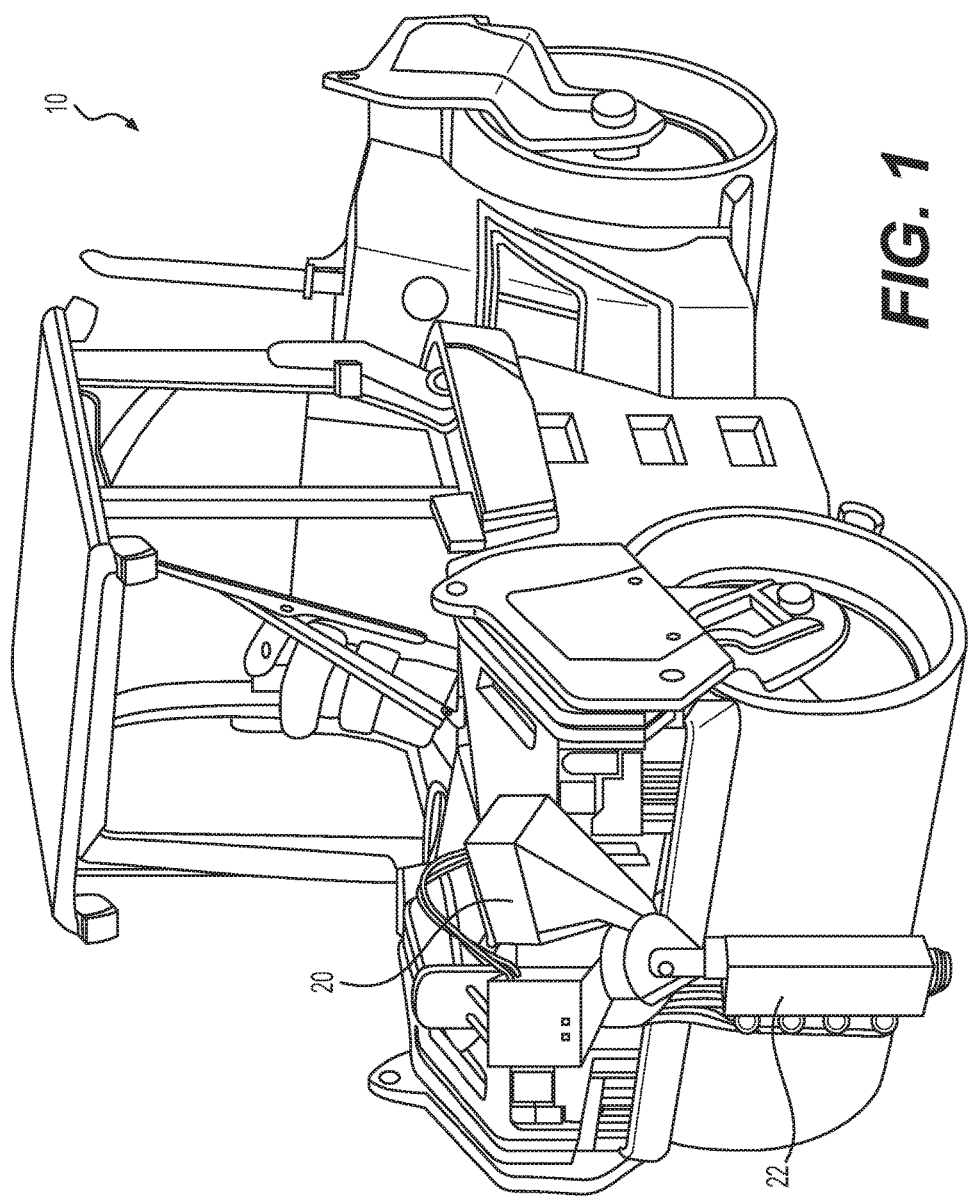
FIG. 1 illustrates an exemplary application of a cementitious composition in accordance with various embodiments of this disclosure.

The base polymer of high strength cementitious composites, and in particular, macro-defect-free (MDF) cementitious composites, is a water-soluble, hydrophilic polymer such as polyvinyl alcohol (PVOH). This polymer can serve as the bag for containment of the ingredients that make up the composite. The water-soluble polyvinyl alcohol bag may hold the amounts of each of the dry ingredients that make up the composite, as well as the amount of water required when mixing all of the ingredients. The water may be in the form of microencapsulated water spheres that burst upon mixing. The microencapsulated water spheres can be formed by a variety of different methods, and may include water droplets encapsulated in a polymer or nanoparticles that also form part of the desired final composition. The microencapsulated water spheres may contain water that is mildly acidic (with a pH less than 7) in some implementations such that the water released upon mixing of the composition may help to retard the setting process. The bag containing all of the dry ingredients for making the MDF cement along with the correct amount of water in the form of microencapsulated water spheres may be transported to a location where the cement is needed for repairs or other applications. As shown in FIG. 1, one example of an application of the MDF cement may be extruding the cement into a pothole or other defect in a road surface directly in front of a compactor 10. The compactor 10 may be equipped with a hopper 20 for receiving one or more bags of MDF cement in accordance with various implementations of this disclosure. A single screw extruder, twin screw extruder, or other mixing and extruding mechanism 22 may also be mounted to the front of the compactor 10 to receive each bag of MDF cement from the hopper 20, mix the MDF cementitious composite, and extrude the cement into the pothole or other desired point of application. The high viscosity and rapid cure rate of the extruded cement allows for repairs to roads and other traffic surfaces with a minimal amount of time during which traffic is disrupted.

In alternative implementations, each bag of MDF cement ingredients may contain all of the necessary dry ingredients for producing the desired composite, but without the microencapsulated water spheres. In these alternative implementations the required amount of water may be measured and added to the hopper 20 along with one or more bags of MDF cement ingredients before mixing and extruding the cement. However, an advantage of providing the bags of MDF cement ingredients containing all of the required water in the form of microencapsulated water spheres is that no extra water is required at the work site where a repair is being performed. Additionally, the precise amounts of the various dry ingredients, including the water-soluble polyvinyl bag itself, which provides exactly the desired amount of polymer, and the precise amount of water needed to produce the finished composition can be carefully controlled by providing all of the dry ingredients and water needed with each bag.

The MDF cementitious composite ingredients provided in bags in accordance with various implementations of this disclosure are materials that have, as a considerable part of their strength, reliance upon ionic and covalent bonding associated with hydrated minerals and gels. Compared to traditional cements and concretes, these MDF cements are characterized by a high flexural strength (>100 MPa) and modulus of elasticity (>30 GPa). As discussed above, high shear mixing, such as performed by the extruding mechanism 22 shown in FIG. 1, results in low amounts of defects that may be caused by voids, pores, or capillaries left behind in more traditional cement composites from air bubbles or the evaporation of water. The high polymer content and low water content in accordance with various implementations of this disclosure result in the MDF cementitious composite behaving like an elastomer during the mixing and curing processes.

High alumina cements (HACs) have been found to give superior strength compared to other cement types used in MDF cements. However, the hydrophilic polymer, polyvinyl alcohol (PVOH) used in MDF cements may cause residual water uptake that lowers the strength and modulus of elasticity of a finished product made from the MDF cement upon exposure to water or water vapor. The surfaces of high alumina cement particles are abraded during mixing which releases both calcium ions and aluminum ions into solution to form $Ca(OH)_2$ and $Al(OH)_3$, along with various other charged species (for example $Ca(OH)_3^-$ and $Al(OH)_4^-$ may be present). The alcohol side groups of the PVOH polymer then chemically bind with the ionic species generated and form a highly crosslinked ionomer—which reduces polymer chain flexibility and makes for a rigid composite.

This crosslinking is instrumental in providing much of the desirable flexural strength and high modulus of elasticity of the finished product. However, continued exposure of the finished, molded product to water or water vapor after the MDF cement has solidified may displace some of the ionic crosslinking and thereby compromise the strength and modulus of elasticity of the finished product. In some applications utilizing conventional MDF cement, it has been found that over half of the starting strength and two-thirds of the starting modulus of elasticity of the cement may be lost after just a few weeks of water immersion.

Various additives and methods of manufacturing have been tried in order to improve retention of the starting strength and modulus of elasticity after water immersion or exposure to extended periods of high humidity. Some methods that have been explored include the addition of aminosilanes, the addition of titanates, and the substitution of phenolic resins for polyvinyl alcohol. None of these methods have yielded an acceptable water resistance with minimal impact to processing and cost. A MDF cement recipe is based on a mixture of polyvinyl alcohol polymer, water, and high alumina cement. Polyvinyl alcohol (PVOH) is prepared by the saponification of polyvinyl acetate (PVAA). The polyvinyl alcohol that has typically been used in the composition of conventional MDF cement is a 78%-80% saponified polyvinyl alcohol acetate (PVAA). Grades of PVAA with saponification levels below about 85% are referred to in this disclosure as "lower saponification grades", and grades of PVAA with saponification levels equal to or greater than 85% are referred to as "higher saponification grades". It has been found that PVOH produced from the lower saponification grades of PVAA provides a good balance of strength and processing time. However, a problem with the PVOH obtained from 78%-80% saponified PVAA is that these lower saponification grades are not readily available, and are significantly more expensive than higher saponification grades with 85% or higher saponified PVAA. The lower saponification grades of PVAA have higher percentages of residual acetates, and the higher saponification grades of PVAA have lower percentages of residual acetates. For example, a 70% saponified grade of PVAA has about 30% residual acetates, and a 90% saponified grade of PVAA has about 10% residual acetates.

As the saponification percentage of PVAA increases, and the amount of residual acetates decreases, the available time for mixing and molding of the MDF cement is significantly reduced. The alkalinity of the MDF cement mixture saponifies the residual acetate groups and generates alcohol groups insitu. This chemical step slows the crosslinking rate of the PVOH with ionic species, and the acetate counter ions also slows the crosslinking rate. However, grades of PVAA with higher levels of saponification, such as higher saponification grades with greater than or equal to 85% saponified PVAA, are less expensive and more readily available than the lower saponification grades of 78%-80% saponified PVAA that have traditionally been used in MDF cement compositions. Nevertheless, these higher saponification grades of PVAA have not been used in MDF cements because of their short processing times. Various implementations of the present disclosure allow for the use of these more readily available and less expensive higher saponification grades of PVAA by the addition of an appropriate retarder to the recipe. Effective retarders may include organic acid retardants such as acetic acid, citric acid, tartartic acid, succinic acid, and polymeric acids such as polyacrylic acid. The addition of these organic acid retardants to the MDF cement compositions may allow for adequate processing time when using grades of PVAA with saponification levels that are greater than or about equal to 85%.

For PVOH, the molecular weight is related to a 4% solution viscosity. A solution viscosity of 20 centipoise or greater is generally desired for the best combination of processing, strength, and modulus of elasticity. This high molecular weight/high viscosity characteristic results in a MDF cement that exhibits thixotropic properties. As a result, in applications such as shown in FIG. 1, the MDF cement is extruded in a viscous and non-self-leveling mass over an area that needs repairing, or extruded into the shape of a desired article. Pressure applied to the extruded composite molds the composite to a desired configuration, and formulations with rapid curing times allow the material to achieve functional mechanical properties in less than 2 hours. In a preferred embodiment, a 4% solution viscosity of over 40 centipoise represents a polymer with excellent processing characteristics and excellent mechanical properties of a molded article.

The MDF cement ingredient bags are compounded using high-shear mixing, such as by employing a single screw extruder, a twin screw extruder, a continuous compounding mixer such as the FARREL CONTINUOUS MIXER (FCM™), a kneader such as the BUSS KNEADER™ manufactured by Buss AG of Switzerland, a two-roll mill, or an internal mixer such as the BANBURY®-type internal mixer. The aforementioned organic acid retardants may be added as powders to the bags of MDF cement ingredients.

Example 1 below discloses a recipe for a MDF cementitious composition in accordance with an embodiment of this disclosure, wherein the MDF cementitious composition includes an organic acid retardant, polyacrylic acid:

| Example 1 | | |
|---|---|---|
| Polymer | Selvol 540 | 100 parts by weight |
| Water | (120 parts combined with polymer, 60 parts added with cement) | 120 + 60 parts by weight |
| Cement - 71% alumina HAC | Secar 71 | 1500 parts by weight |
| Retarder - polyacrylic acid | Sokalan CP 10S | 20 parts by weight |

The recipe in Example 1 was mixed on a two-roll mill and molded in a heated hydraulic press (>5 MPa pressure) at ~90° C. for >30 minutes. The sample material was then postcured at about 90° C. for 48 hours and then cut into flexural bars (~4 mm thick×~14 mm wide×~150 mm long).

The material initial properties were assessed and then samples were immersed in a stagnant water bath for various lengths of time and the changes in flexural properties were measured. The results of these measurements are shown in Table 1:

TABLE 1

| No aging | Initial strength (max), MPa | 203 |
|---|---|---|
| | Initial modulus (avg), GPa | 57 |
| 2 week water immersion | Strength (max), MPa | 130 |
| | Modulus (avg), GPa | 25 |
| 5 weeks immersion | Strength (max), MPa | 127 |
| | Modulus (avg), GPa | 18 |
| 9 weeks immersion | Strength (max), MPa | 83 |
| | Modulus (avg), GPa | 15 |
| 12 weeks immersion | Strength (max), MPa | 76 |
| | Modulus (avg), GPa | 13 |

As can be seen in Table 1, the embodiment including the addition of an organic acid retardant to a MDF cement composition made with a higher saponification grade of PVAA (≥85% saponified) still has a significant reduction in flexural strength and modulus of elasticity upon long-term water immersion, despite having an excellent initial strength.

In accordance with various preferred embodiments of the present disclosure, it has been unexpectedly discovered that the inclusion of a metallic coagent and peroxide crosslinking initiator can significantly improve the moisture resistance of products made from MDF cementitious compositions without the problems associated with adding titanates or zirconates, as attempted in some conventional MDF cementitious compositions. Examples of the metallic coagents that may be added to the MDF cementitious composition in accordance with various preferred embodiments of this disclosure may include zinc diacrylate (ZDA), zinc monoacrylate (ZMA), zinc dimethacrylate (ZDMA), calcium diacrylate (CDA), aluminum triacrylate, magnesium diacrylate, and other similar metal-bound reactive monomers that may be reacted with peroxides. Peroxide crosslinking initiators that may find utility in such recipes include dicumyl peroxide (tradename DI-CUP), a,a'-bis(tert-butylperoxy) diisopropylbenzene (tradename VUL-CUP), 1,1-di(tert-butylperoxy)-3,3,5-trimethylcyclohexane (tradename LUPEROX 231), n-butyl-4,4-di(t-butylperoxy)valerate (tradename LUPEROX 230), and lower-temperature peroxides such as methyl ethyl ketone peroxide (MEKP) and hydrogen peroxide.

Example 2 below discloses a recipe prepared using this combination of metallic coagent and peroxide crosslinking initiator.

| Example 2 | | |
|---|---|---|
| Polymer | Selvol 540 | 100 parts by weight |
| Water | (120 parts combined with polymer, 100 parts added with cement) | 120 + 100 parts by weight |
| Cement - 71% alumina HAC | Secar 71 | 2000 parts by weight |
| Processing aid | Zinc Stearate | 20 parts by weight |
| Metallic Coagent - Calcium Diacrylate | Dymalink 636 (SR636) | 60 parts by weight |
| Peroxide crosslinking initiator | Di-Cup 40KE | 20 parts by weight |

The recipe in Example 2 was mixed on a two-roll mill and molded in a heated hydraulic press (>5 MPa pressure) at ~90° C. for >30 minutes. The sample material was then postcured at 90° C. for 24 hours and then cut into flexural bars (~4 mm thick×~14 mm wide×~150 mm long). The material initial properties were assessed and then samples were immersed in a stagnant water bath for various lengths of time and the change in flexural properties were measured. This data is shown in Table 2.

TABLE 2

| No aging | Initial strength (max), MPa | 121 |
|---|---|---|
|  | Initial modulus (avg), GPa | 56 |
| 2 week water immersion | Strength (max), MPa | 92 |
|  | Modulus (avg), GPa | 40 |
| 4 weeks immersion | Strength (max), MPa | 108 |
|  | Modulus (avg), GPa | 36 |
| 8 weeks immersion | Strength (max), MPa | 105 |
|  | Modulus (avg), GPa | 27 |
| 12 weeks immersion | Strength (max), MPa | 94 |
|  | Modulus (avg), GPa | 28 |

As can be seen in Table 2, the material of example 2 exhibits much less reduction in both strength and modulus of elasticity compared to the material of example 1 that did not contain both the peroxide and metallic coagent. Furthermore, this material exhibits better shelf life and processability than formulations that contain titanates or zirconates as a moisture resistant additive.

Example 3 below combines the excellent shelf life benefits of adding an organic acid with the moisture resistant benefits of combined peroxide and metallic coagent. The organic acid may help with moisture resistance as well.

| Example 3 | | |
|---|---|---|
| Polymer | Selvol 540 | 100 parts by weight |
| Water | (120 parts combined with polymer, 80 parts added with cement) | 120 + 80 parts by weight |
| Cement - 71% alumina HAC | Secar 71 | 2000 parts by weight |
| Organic acid retarder | Citric Acid (50% soln) | 20 parts by weight |
| Metallic Coagent - Zinc Diacrylate | Dymalink 705 (SR705) | 50 parts by weight |
| Peroxide crosslinking agent | Di-Cup 40KE | 10 parts by weight |

The recipe in Example 3 was mixed on a two-roll mill and molded in a heated hydraulic press (>5 MPa pressure) at ~90° C. for >30 minutes. The sample material was then postcured at 90° C. for 24 hours and then cut into flexural bars (~4 mm thick×~14 mm wide×~150 mm long). The material initial properties were assessed and then samples were immersed in a stagnant water bath for various lengths of time and the change in flexural properties were measured—this data is shown in Table 3.

TABLE 3

| No aging | Initial strength (max), MPa | 113 |
|---|---|---|
|  | Initial modulus (avg), GPa | 39 |
| 2 week water immersion | Strength (max), MPa | 138 |
|  | Modulus (avg), GPa | 36 |
| 5 weeks immersion | Strength (max), MPa | 107 |
|  | Modulus (avg), GPa | 36 |
| 8 weeks immersion | Strength (max), MPa | 89 |
|  | Modulus (avg), GPa | 34 |
| 12 weeks immersion | Strength (max), MPa | 82 |
|  | Modulus (avg), GPa | 35 |

As can be seen in Table 3, the combination of organic acid retardant, peroxide, and metallic coagent yields a MDF cement with very little loss in strength or modulus of elasticity after long-term water immersion. Furthermore, because of the organic acid retardant, this formulation has excellent shelf life (>1 hr) and flows well in a mold.

Figure 3:
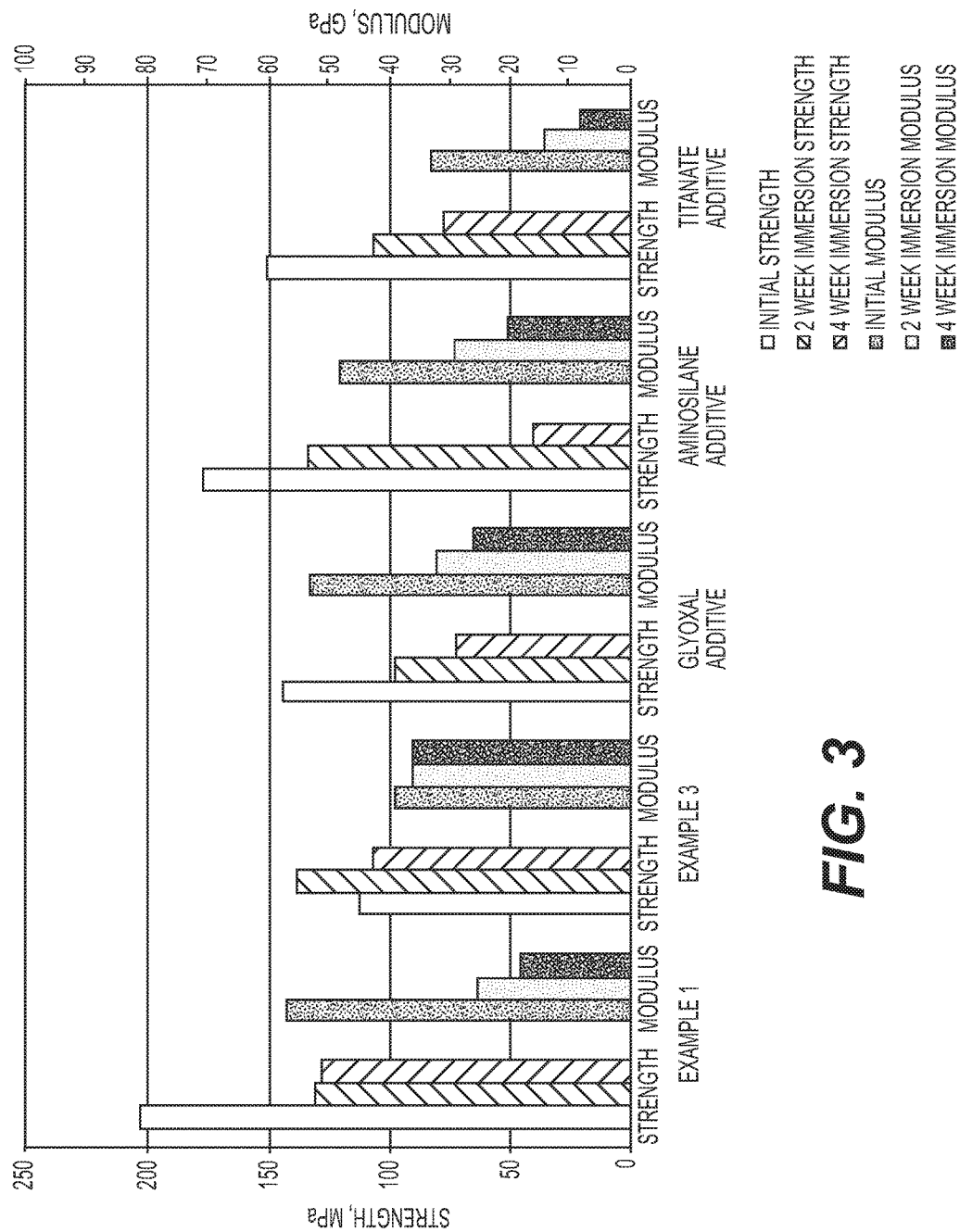
FIG. 3 is a chart showing comparisons between properties of example compositions described in this specification and known technologies.

FIG. 3 shows how the disclosed examples 1 and 3 above compare with other technology known in the art. Glyoxal is known to crosslink PVOH and so has been added in an attempt to slow down moisture ingression into the cured MDF cement. The addition of Glyoxal was found to help modestly, but did not give long-term modulus of elasticity or flexural strength retention. Aminosilanes have also been added to MDF cement to react with the PVOH and impact moisture resistance. The addition of aminosilanes was found to be non-beneficial upon long-term immersion in water. Titanates have also been added to MDF cement in an attempt to improve moisture resistance through crosslinking reactions with PVOH. The addition of titanates was found to be non-beneficial upon long-term immersion in water.

The left-most portion of FIG. 3 shows results for Examples 1 and 3 of the present disclosure. The first vertical bar at the left-most portion of FIG. 3, representing the strength of the material sample from example 1, illustrates a flexural strength in excess of 200 MPa. The strength of the sample decreased to approximately 130 MPa after 2 weeks of immersion in water, and approximately 125 MPa after 4 weeks of immersion in water. The modulus of elasticity of the sample from example 1 was initially approximately 58 GPa, then approximately 23 GPa after 2 weeks of immersion, and approximately 18 GPa after 4 weeks of immersion. The sample of example 3 had an initial flexural strength of approximately 120 MPa. The strength of the sample of example 3 then actually increased to approximately 140 MPa after 2 weeks of immersion in water, and decreased slightly to approximately 110 MPa after 4 weeks of immersion in water. The modulus of elasticity of the sample of example 3 was initially approximately 39 GPa, and then decreased only slightly to approximately 37 GPa after 2 weeks of immersion in water and after 4 weeks of immersion in water.

INDUSTRIAL APPLICABILITY

MDF cementitious compositions in accordance with various embodiments of the present disclosure may be used for structural purposes, much like fiberglass-reinforced thermoplastics and lightweight metals such as aluminum. In comparison to fiberglass-reinforced thermoplastics, the modulus of elasticity for MDF cements in accordance with various embodiments of this disclosure is generally 2-10 times higher than the modulus of elasticity of fiberglass-reinforced thermoplastics. These mechanical characteristics allow for usage of the MDF cement in applications where metals are currently in use and conversion to a molded material was previously prohibited because conventional cementitious composites lacked sufficient flexural strength and modulus of elasticity. In comparison to lightweight metals such as aluminum (modulus of ~70 GPa), the MDF cement materials of this disclosure have similar strength values but are generally less expensive. Therefore, die-cast aluminum parts or wrought aluminum fabrications may be replaced with MDF cement pieces in order to lower product cost.

The packaged composition in accordance with various embodiments of the present disclosure provides a readily portable container that may contain the precise mixture of dry ingredients and water needed to achieve desired mechanical characteristics in an end product produced from the MDF cementitious composition. The water soluble, PVOH bag made from a higher saponified grade of PVAA is inexpensive, and provides both the container and the polymer ingredient needed in the MDF composition. The microencapsulated water spheres may provide precisely the correct amount of water for mixing with the amounts of dry ingredients contained in the bag. The result is that even an inexperienced operator, or someone without access to accurate measuring equipment at a remote site, can be assured of having the right mixture of ingredients to feed into a mixing device such as an extruder for producing a finished product with the desired mechanical properties.

Figure 2:
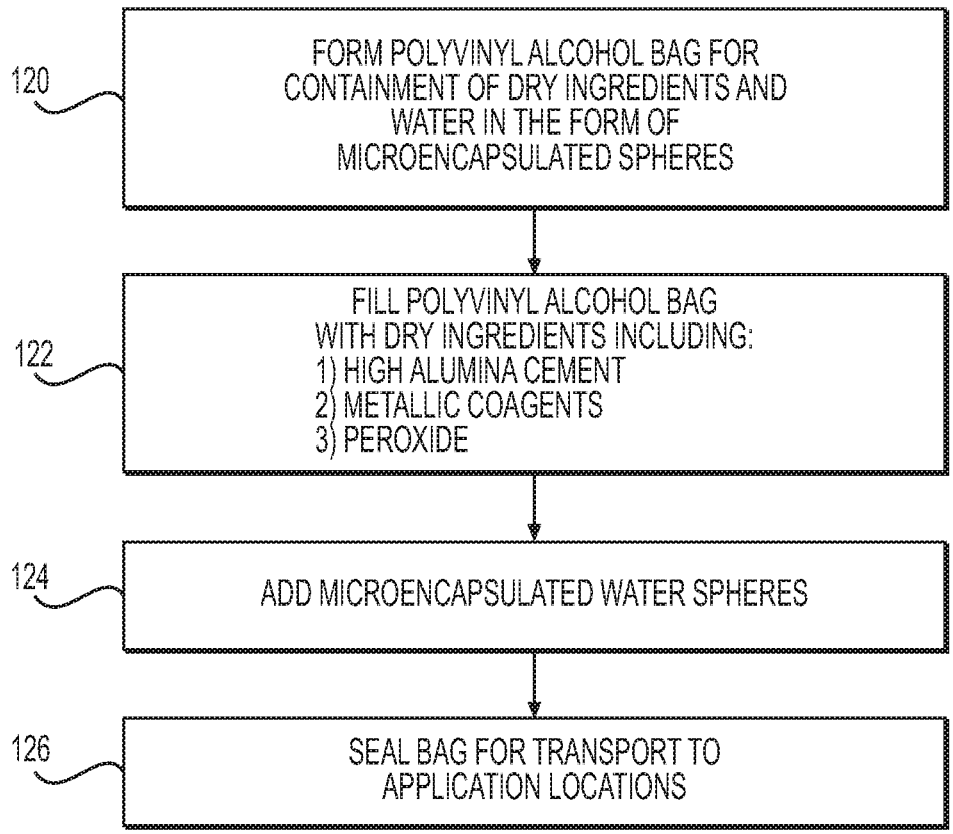
FIG. 2 is a flowchart illustrating exemplary steps for producing a bag containing a cementitious composition in accordance with various embodiments of this disclosure.

FIG. 2 is a flowchart showing an exemplary sequence of steps that may be followed in producing a bag of MDF cement in accordance with various embodiments of this disclosure. At step 120 the polyvinyl alcohol (PVOH) bag may be formed for containment of the dry ingredients and water in the form of microencapsulated spheres. As discussed above, the PVOH may be formed from higher saponified grades of PVAA (≥85% saponified PVAA), which are inexpensive and readily available compared to the lower saponified grades of PVAA (<85% saponified PVAA) that have traditionally been used in the production of MDF cement. The potential problem of very short processing times when using the higher saponified grades of PVAA may be alleviated by the introduction of an organic acid retardant into the mixture in order to allow enough processing time.

At step 122 the PVOH bag may be filled with dry ingredients including high alumina cement (HAC), organic acid, metallic coagents, and peroxide. The correct amount of each of the dry ingredients corresponds to the amount of polymer provided in the form of the PVOH bag. At step 124 the correct amount of water for mixing with all of the dry ingredients may be added in the form of microencapsulated water spheres. The microencapsulation of the water keeps the water from reacting with the dry ingredients during transport and storage of the bags. Optionally, the organic acid may be predissolved in the water that is microencapsulated. When the bags are placed into a mixing device such as an extruder, the high shear mixing breaks up the microencapsulated water spheres, releasing the correct amount of water to produce the desired MDF cementitious composition. At step 126 the PVOH bag may be sealed for transport to application locations, such as the site of potholes or other road surface defects.

It will be apparent to those skilled in the art that various modifications and variations can be made to the disclosed packaged cementitious composition without departing from the scope of the disclosure. Other embodiments of the packaged composition will be apparent to those skilled in the art from consideration of the specification and practice of the disclosure herein. It is intended that the specification and examples be considered as exemplary only, with a true scope of the disclosure being indicated by the following claims and their equivalents.

What is claimed is:

1. A packaged composition, comprising:
a package made from a water-soluble polymer material, the package containing a cementitious composition, the cementitious composition comprising:
a metallic coagent;
a peroxide crosslinking initiator;
water in the form of microencapsulated water spheres; and
high alumina cement.

2. The packaged composition of claim 1, wherein the water-soluble polymer material is polyvinyl alcohol comprising saponified polyvinyl alcohol acetate (PVAA) with a saponification level of greater than or equal to about 85%.

3. The packaged composition of claim 1, wherein the water has a pH below 7.

4. The packaged composition of claim 1, further including an organic acid retardant.

5. The packaged composition of claim 1, wherein proportions of ingredients of the composition and the package by weight comprise:
90-110 parts polyvinyl alcohol;
150-250 parts water; and
1200-3000 parts high alumina cement (HAC).

6. The packaged composition of claim 5, wherein the water-soluble polymer material is polyvinyl alcohol comprising saponified polyvinyl alcohol acetate (PVAA) with a saponification level of greater than or equal to about 85%.

7. The packaged composition of claim 6, further including 10-30 parts by weight of an organic acid retardant selected from the group comprising: acetic acid, citric acid, tartaric acid, succinic acid, and polymeric acids.

8. The packaged composition of claim 1, wherein the microencapsulated water spheres are configured to burst and release the water upon mixing of the package containing the cementitious composition in a high shear mixing procedure.

* * * * *